D. MILITELLO.
PLOW LIFTING MECHANISM FOR TRACTORS.
APPLICATION FILED NOV. 8, 1920.
1,376,894.
Patented May 3, 1921.
2 SHEETS—SHEET 1.
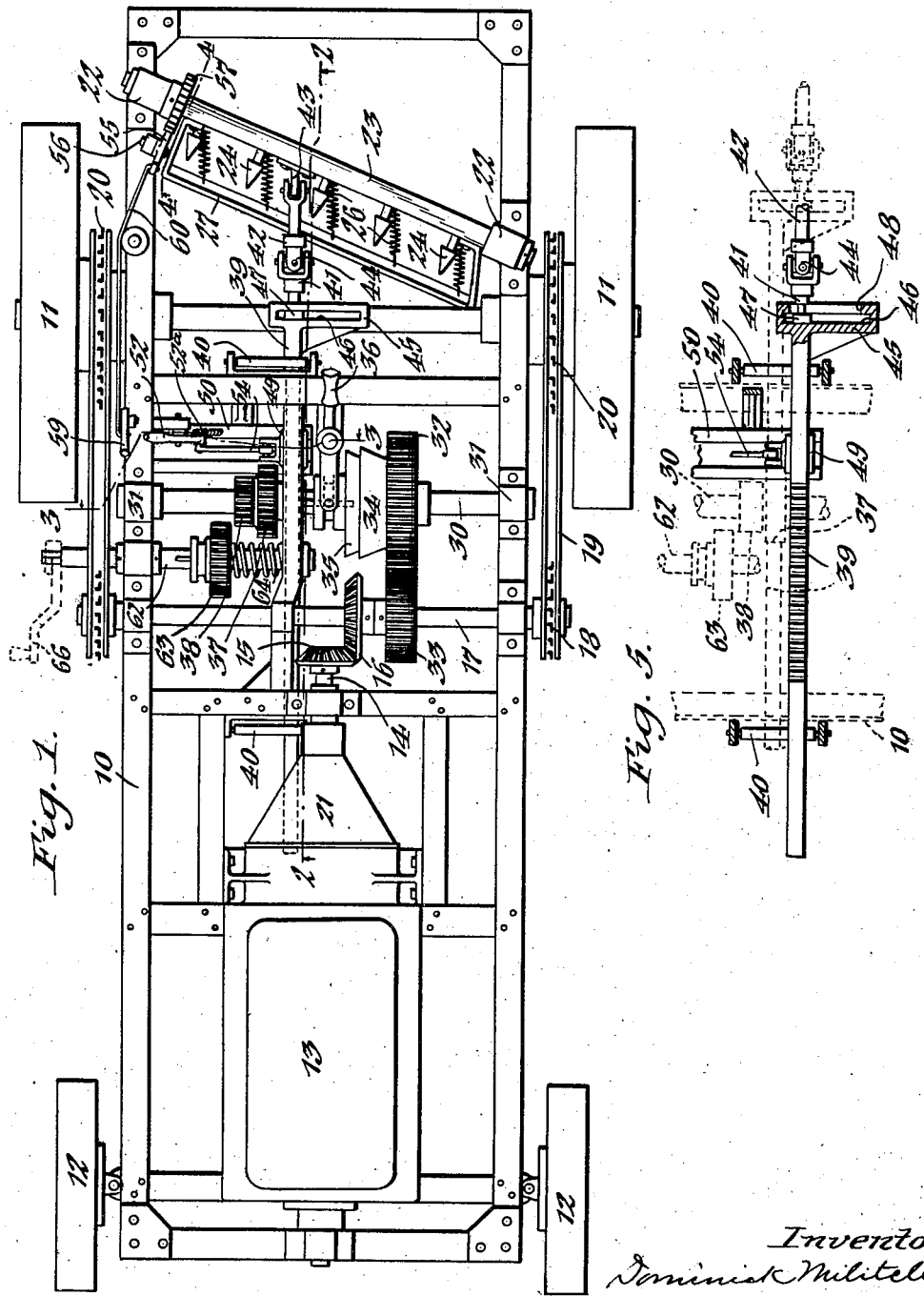

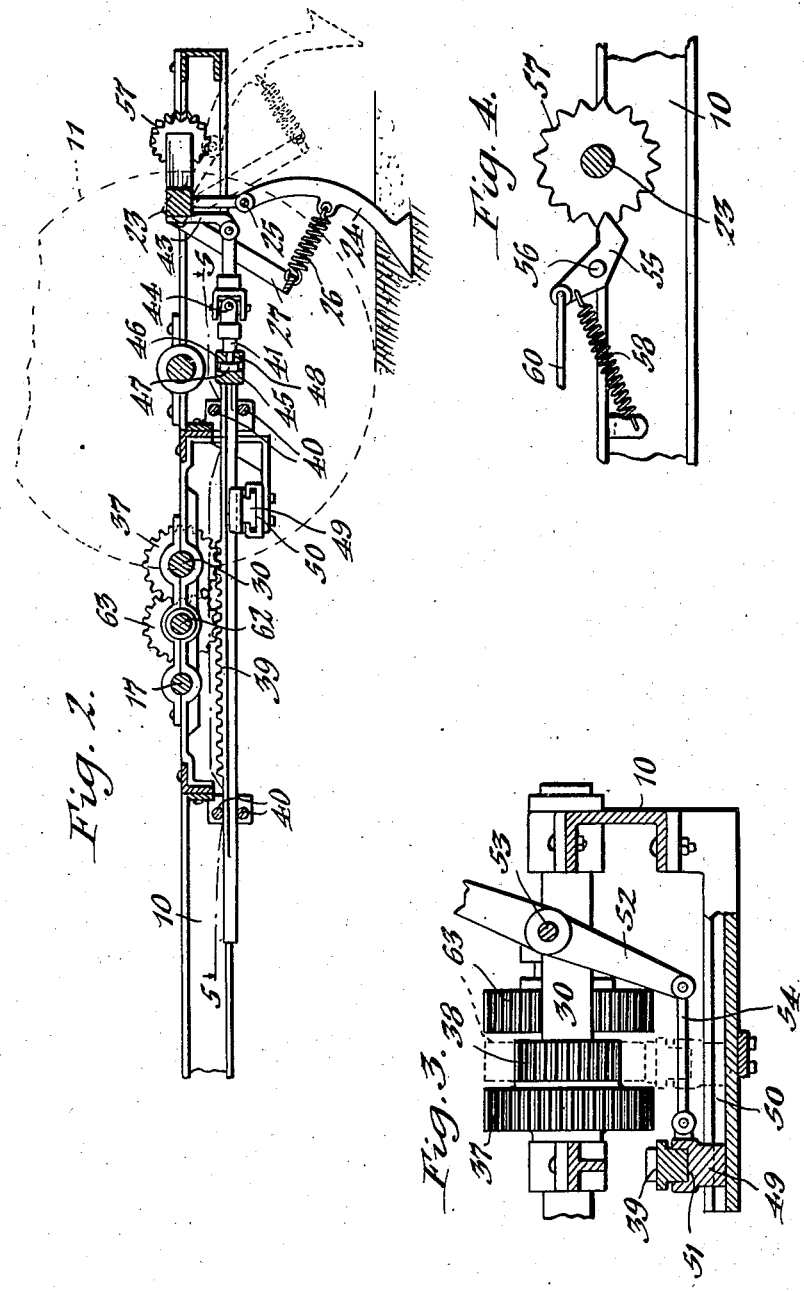

UNITED STATES PATENT OFFICE.

DOMINICK MILITELLO, OF BUFFALO, NEW YORK.

PLOW-LIFTING MECHANISM FOR TRACTORS.

1,376,894. Specification of Letters Patent. Patented May 3, 1921.

Application filed November 8, 1920. Serial No. 422,413.

*To all whom it may concern:*

Be it known that I, DOMINICK MILITELLO, a citizen of the United States, residing at Buffalo, in the county of Erie and State of New York, have invented new and useful Improvements in Plow-Lifting Mechanism for Tractors, of which the following is a specification.

This invention relates to an implement lift-mechanism for tractors which utilizes either hand or power actuated means for raising and lowering a plow or other implement.

Its object is to provide an improved mechanism of this character which is simple and efficient in operation.

In the accompanying drawings: Figure 1 is a top plan view of a tractor showing my improvements applied thereto. Fig. 2 is a longitudinal section thereof on line 2—2, Fig. 1. Fig. 3 is an enlarged fragmentary transverse section on line 3—3, Fig. 1. Fig. 4 is an enlarged fragmentary section on line 4—4, Fig. 1. Fig. 5 is a horizontal section on line 5—5, Fig. 2.

Similar characters of reference indicate corresponding parts throughout the several views.

10 indicates the main frame of the tractor which may be of any suitable and well known construction, it being supported at its rear end on traction or driven wheels 11 and at its front end on steering wheels 12. Mounted on the front portion of the frame is a motor 13, which serves to propel the tractor and also to operate the plow lift mechanism. The driven shaft 14 is provided at its rear end with a bevel gear 15 which meshes with a similar gear 16 on a propelling shaft 17 journaled transversely of the tractor frame and provided with sprocket wheels 18 which are connected by sprocket chains 19 with sprocket wheels 20 carried by the traction wheels 11. Suitable transmission mechanism 21 is interposed between the motor shaft and driven shaft 14.

Journaled in bearings 22 in the rear end of the tractor frame is a diagonally disposed horizontal plow beam 23 to which are secured a plurality of depending plow shares, cultivator blades, harrows or other like implements 24. This beam is capable of oscillatory movement about its horizontal axis, so as to raise and lower the implements carried thereby to positions in which they are inoperative and operative, respectively. The plow shares are preferably pivoted at 25 to the plow beam, coil springs 26 being provided for normally retaining them in their pendent or operative position. As shown in Fig. 2, these springs are connected at one end to the respective plow shares and at their opposite ends to a forwardly-extending yoke or frame member 27 carried by the beam 23. Thus, should any of the plow shares strike a stone or other similar obstruction, the springs permit them to swing rearwardly, after which they return to their normal pendent position as soon as the obstruction has been cleared. By this construction, the liability to breakage of the parts is eliminated.

The means for actuating the plow beam, to effect the raising of the plow shares above the ground, are preferably constructed as follows:

Arranged parallel with and in rear of the propelling shaft 17 is a countershaft 30 journaled in suitable bearings 31 in the tractor frame. Loosely mounted thereon is a gear 32 constantly in mesh with a gear 33 fixed on the propelling shaft. The rotation of the countershaft is controlled by a suitable clutch comprising a female member 34, preferably integral with the gear 32, which is held against longitudinal movement on its shaft, and a male member 35 splined on said countershaft and capable of being shifted into and out of engagement with said male member. These clutch members are normally out of engagement, a suitable lever 36 being provided for engaging them when it is desired to rotate the shaft 30. Fixed on the latter are two gears 37, 38, the former being adapted for engagement with a laterally shiftable and longitudinally-movable gear rack 39 operatively connected at its rear end to the plow beam, whereby when said rack is moved rearwardly or forwardly, the plow shares are correspondingly raised or lowered.

As shown in Figs. 2, 3 and 5, this gear rack is disposed lengthwise below the shafts 17 and 30 and guided adjacent its ends between superposed guide rollers 40, 40 suitably supported on the tractor frame. These rollers are of sufficient length to permit the rack to be shifted laterally into its respective operative position, as hereinafter described. At its rear end, said rack is suitably connected to the front end of a flexible or sectional link 41, 42, the rear end of the latter being pivotally connected to a depending crank arm 43 carried by the plow beam 23. The sections of the link are preferably connected to each other by a universal joint 44. The gear rack 39 is capable of being shifted laterally independently of the link 41, 42 and for this purpose is provided at its rear end with a laterally extending portion 45 which is provided with a vertical and transversely extending slot 46 with which the attaching head 47 of the front link section 41 is adapted to engage. The shank or body portion of this link engages a corresponding horizontal slot 48 arranged in the rear wall of said vertical slot. By this construction, the rack is at all times operatively connected to the plow beam and yet is permitted to have a lateral shiftable movement without destroying its connection with said beam.

Any suitable means may be employed for shifting the gear rack 39 laterally into and out of engagement with its actuating gear 37, but as shown in the drawings, the same preferably comprises a shifting block 49 the lower portion of which is arranged for lateral movement in a transverse guideway or track 50 suitably secured to the tractor frame below said rack, while the upper portion thereof is provided with a longitudinal guide groove 51 for the reception of the lower side of the gear rack. This guide groove is comparatively deep to prevent the rack from being displaced therefrom. The shifting of the block to effect a corresponding movement of the rack is accomplished by a lever 52 fulcrumed at 53 to an adjacent portion of the tractor frame, the lower arm of said lever being connected with said block by a link 54. A spring 52ª normally holds the lever 52 in its inoperative position, as shown by full lines in the drawings.

After the plows are elevated to the desired position, a suitable stop is employed for arresting the further turning movement of the plow beam. The means shown in Figs. 1 and 4 of the drawings consist of a pawl 55, pivoted at 56, which is adapted to coöperate with a toothed wheel 57 fixed on the plow beam so as to turn therewith. This pawl is normally held in engagement with said wheel by a spring 58 and is adapted to be released from engagement therewith by a lever 59 operatively connected with said pawl by a flexible link 60. By this construction, the plows are not only reliably held in their elevated or inoperative position, but are also firmly held against rocking movement in their pendent or operative position.

The means for lowering the plows from their elevated to their operative position are preferably constructed as follows:

Interposed between the propelling shaft 17 and countershaft 30 is a relatively short reversing shaft 62 which is suitably journaled in the tractor frame and upon which is splined a shiftable gear 63 adapted to mesh with the gear 38 and the rack 39, whereby the movement of the latter is reversed to cause the plow beam to be moved downwardly and forwardly. As shown in Figs. 1 and 3, the gear 38 is of smaller diameter than either of the rack engaging gears 37, 63. This shiftable gear is normally held out of engagement with the gear 38 by a spring 64 and is adapted to be moved into engagement therewith by a forked lever, not shown. Thus, when it is desired to lower the plows, the reversing gear 63 is shifted into engagement with the gear 38 and the rack 39 is shifted into engagement with said first-named gear, after which the pawl 55 is disengaged from the wheel 57 and power is transmitted to the shaft 30 by engaging the clutch members 34, 35 to rotate said gears. When the plows have reached their pendent or operative position, the gear 63 is shifted from engagement with the gear 38 and rack 39, whereupon the pawl actuating lever 59 is released to allow its pawl to engage the toothed wheel 57 and hold the plow beam in operative position.

To permit of raising and lowering the plows by hand, if desired, an operating handle 66 may be detachably connected to the outer end of the reversing shaft 62, which, when turned in one direction or the other, imparts a corresponding forward or rearward movement of the rack to rock the plow beam. In this case, it is only necessary to shift the rack into engagement with the gear 37 and the gear 63 into engagement with the gear 38.

In the operation of this plow lift mechanism, assume the engine to be running and the parts to be in the position shown by full lines in the drawings, in which the plows are in their operative or pendent position. To raise the plows above the level of the ground to the position shown by dotted lines in Fig. 2, the pawl 55 is released from engagement with the toothed wheel 57, the rack 39 shifted into engagement with the gear 37 and the clutch 34, 35 engaged to rotate the shaft 30. This causes the rack to move rearwardly and turn the plow beam 23 upwardly and rearwardly, whereby the plows are elevated above the ground. When the plows are raised to the desired position, the clutch is disengaged and the pawl actuating lever 59 released to allow its pawl to engage the wheel 57 and hold the plow-beam in such position, after which the rack actuating lever 52 is released to allow the rack to return to its normal disengaged position. When the plows are to be lowered, the reversing gear 63 is shifted into engagement with the gear 38, and the rack is shifted into engagement with said reversing gear. The pawl 55 is then released and the clutch engaged to transmit motion to the reversing gear, which moves the rack forwardly and causes the plow beam to be turned downwardly and forwardly to lower the plows to the position shown by full lines in Fig. 2. When the plows have reached this position, the reversing gear is released from engagement with the rack and the pawl allowed to engage the toothed wheel to reliably hold the plow beam in position, after which the clutch is disengaged and the rack shifted to its normal position.

I claim as my invention:

1. In a device of the character described, the combination of a tractor frame, a beam journaled transversely thereof for oscillatory movement, and carrying a plurality of implements, a laterally shiftable gear rack arranged lengthwise of said frame, a connection between said beam and said rack, the rack being laterally movable independently of said connection, a driving gear, and means for shifting said rack into and out of engagement with said driving gear.

2. In a device of the character described, the combination of a tractor frame, an oscillatory beam arranged transversely thereof and carrying a plurality of implements, a driving gear, a laterally shiftable gear rack movable into and out of engagement with said driving gear, and means for operatively connecting said rack with said beam whereby the latter is oscillated to raise and lower said implements, said means comprising a flexible connection, one end of which is pivotally connected to said beam below the axis thereof while the other end thereof is slidably connected with the adjacent end of said rack.

3. In a device of the character described, the combination of a frame, a beam journaled thereon, a plurality of implements depending from said beam and pivotally connected therewith, a yoke secured to said beam and extending forwardly therefrom, and means for yieldingly connecting said implements with said yoke.

DOMINICK MILITELLO.